US012407712B2

(12) United States Patent
Bazalgette et al.

(10) Patent No.: US 12,407,712 B2
(45) Date of Patent: *Sep. 2, 2025

(54) ARTIFICIAL INTELLIGENCE CYBER SECURITY ANALYST

(71) Applicant: Darktrace Holdings Limited, Cambridge (GB)

(72) Inventors: Timothy Bazalgette, Knebworth (GB); Dickon Humphrey, Cambridge (GB); Carl Salji, Bedford (GB); Jack Stockdale, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,250

(22) Filed: May 16, 2022

(65) Prior Publication Data

US 2022/0353286 A1     Nov. 3, 2022

Related U.S. Application Data

(63) Continuation of application No. 16/278,918, filed on Feb. 19, 2019, now Pat. No. 11,336,669.
(Continued)

(51) Int. Cl.
*H04L 9/00*     (2022.01)
*G06F 3/04842*     (2022.01)
(Continued)

(52) U.S. Cl.
CPC ...... *H04L 63/1441* (2013.01); *G06F 3/04842* (2013.01); *G06F 3/0486* (2013.01);
(Continued)

(58) Field of Classification Search
CPC .. H04L 63/1441; H04L 63/1416; G06N 20/00
(Continued)

(56) References Cited

U.S. PATENT DOCUMENTS 6,154,844 A    11/2000   Touboul et al.
6,965,968 B1    11/2005   Touboul
(Continued)

FOREIGN PATENT DOCUMENTS

EP           2922268 A1    9/2015
WO    2001031420 A2    5/2001
(Continued)

OTHER PUBLICATIONS

United States Patent and Trademark Office, Non-Final Office Action, May 10, 2021.
(Continued)

*Primary Examiner* — Christopher J Brown
(74) *Attorney, Agent, or Firm* — Rutan and Tucker, LLP

(57) ABSTRACT

An analyzer module forms a hypothesis on what are a possible set of cyber threats that could include the identified abnormal behavior and/or suspicious activity with AI models trained with machine learning on possible cyber threats. The Analyzer analyzes a collection of system data, including metric data, to support or refute each of the possible cyber threat hypotheses that could include the identified abnormal behavior and/or suspicious activity data with the AI models. A formatting and ranking module outputs supported possible cyber threat hypotheses into a formalized report that is presented in 1) printable report, 2) presented digitally on a user interface, or 3) both.

20 Claims, 7 Drawing Sheets

Related U.S. Application Data

(60) Provisional application No. 62/632,623, filed on Feb. 20, 2018.

(51) Int. Cl.

| | | |
|---|---|---|
| *G06F 3/0486* | (2013.01) | |
| *G06F 16/2455* | (2019.01) | |
| *G06F 18/23* | (2023.01) | |
| *G06F 18/232* | (2023.01) | |
| *G06F 21/36* | (2013.01) | |
| *G06F 21/55* | (2013.01) | |
| *G06F 40/40* | (2020.01) | |
| *G06N 20/00* | (2019.01) | |
| *G06N 20/10* | (2019.01) | |
| *G06V 30/10* | (2022.01) | |
| *H04L 9/40* | (2022.01) | |
| *H04L 41/22* | (2022.01) | |
| *H04L 43/045* | (2022.01) | |
| *H04L 51/212* | (2022.01) | |
| *H04L 51/224* | (2022.01) | |
| *H04L 51/42* | (2022.01) | |
| *G06N 20/20* | (2019.01) | |

(52) U.S. Cl.
CPC .......... *G06F 16/2455* (2019.01); *G06F 18/23* (2023.01); *G06F 18/232* (2023.01); *G06F 21/36* (2013.01); *G06F 21/554* (2013.01); *G06F 21/556* (2013.01); *G06F 40/40* (2020.01); *G06N 20/00* (2019.01); *G06N 20/10* (2019.01); *G06V 30/10* (2022.01); *H04L 41/22* (2013.01); *H04L 43/045* (2013.01); *H04L 51/212* (2022.05); *H04L 51/224* (2022.05); *H04L 51/42* (2022.05); *H04L 63/0209* (2013.01); *H04L 63/0428* (2013.01); *H04L 63/101* (2013.01); *H04L 63/14* (2013.01); *H04L 63/1416* (2013.01); *H04L 63/1425* (2013.01); *H04L 63/1433* (2013.01); *H04L 63/1483* (2013.01); *H04L 63/20* (2013.01); *G06N 20/20* (2019.01)

(58) Field of Classification Search
USPC .......................................................... 726/23
See application file for complete search history.

(56) References Cited

U.S. PATENT DOCUMENTS

| | | | |
|---|---|---|---|
| 7,307,999 | B1 | 12/2007 | Donaghey |
| 7,418,731 | B2 | 8/2008 | Touboul |
| 7,448,084 | B1 | 11/2008 | Apap et al. |
| 8,312,540 | B1 | 11/2012 | Kahn et al. |
| 8,819,803 | B1 | 8/2014 | Richards et al. |
| 8,879,803 | B2 | 11/2014 | Ukil et al. |
| 8,966,036 | B1 | 2/2015 | Asgekar et al. |
| 9,043,905 | B1 | 5/2015 | Allen et al. |
| 9,106,687 | B1 | 8/2015 | Sawhney et al. |
| 9,185,095 | B1 | 11/2015 | Moritz et al. |
| 9,213,990 | B2 | 12/2015 | Adjaoute |
| 9,401,925 | B1 | 7/2016 | Guo et al. |
| 9,516,039 | B1 | 12/2016 | Yen et al. |
| 9,516,053 | B1 | 12/2016 | Muddu et al. |
| 9,641,544 | B1 | 5/2017 | Treat et al. |
| 9,712,548 | B2 | 7/2017 | Shmueli et al. |
| 9,727,723 | B1 | 8/2017 | Kondaveeti et al. |
| 10,268,821 | B2 | 4/2019 | Stockdale et al. |
| 10,419,466 | B2 | 9/2019 | Ferguson et al. |
| 10,516,693 | B2 | 12/2019 | Stockdale et al. |
| 10,701,093 | B2 | 6/2020 | Dean et al. |
| 11,336,669 | B2 | 5/2022 | Bazalgette et al. |
| 2002/0186698 | A1 | 12/2002 | Ceniza |
| 2003/0070003 | A1 | 4/2003 | Chong et al. |
| 2004/0083129 | A1 | 4/2004 | Herz |
| 2004/0167893 | A1 | 8/2004 | Matsunaga et al. |
| 2005/0065754 | A1 | 3/2005 | Schaf et al. |
| 2007/0118909 | A1 | 5/2007 | Hertzog et al. |
| 2007/0294187 | A1 | 12/2007 | Scherrer |
| 2008/0005137 | A1 | 1/2008 | Surendran et al. |
| 2008/0109730 | A1 | 5/2008 | Coffman et al. |
| 2009/0106174 | A1 | 4/2009 | Battisha et al. |
| 2009/0254971 | A1 | 10/2009 | Herz et al. |
| 2010/0009357 | A1 | 1/2010 | Nevins et al. |
| 2010/0095374 | A1 | 4/2010 | Gillum et al. |
| 2010/0125908 | A1 | 5/2010 | Kudo |
| 2010/0235908 | A1 | 9/2010 | Eynon et al. |
| 2010/0299292 | A1 | 11/2010 | Collazo |
| 2011/0093428 | A1 | 4/2011 | Wisse |
| 2011/0213742 | A1 | 9/2011 | Lemmond et al. |
| 2011/0261710 | A1 | 10/2011 | Chen et al. |
| 2012/0096549 | A1 | 4/2012 | Amini et al. |
| 2012/0137367 | A1 | 5/2012 | Dupont et al. |
| 2012/0209575 | A1 | 8/2012 | Barbat et al. |
| 2012/0210388 | A1 | 8/2012 | Kolishchak |
| 2012/0284791 | A1 | 11/2012 | Miller et al. |
| 2012/0304288 | A1 | 11/2012 | Wright et al. |
| 2013/0091539 | A1 | 4/2013 | Khurana et al. |
| 2013/0198119 | A1 | 8/2013 | Eberhardt, III et al. |
| 2013/0198840 | A1 | 8/2013 | Drissi et al. |
| 2013/0254885 | A1 | 9/2013 | Devost |
| 2014/0007237 | A1 | 1/2014 | Wright et al. |
| 2014/0074762 | A1 | 3/2014 | Campbell |
| 2014/0165207 | A1 | 6/2014 | Engel et al. |
| 2014/0201836 | A1* | 7/2014 | Amsler .................. H04L 63/20 726/23 |
| 2014/0215618 | A1 | 7/2014 | Amit |
| 2014/0325643 | A1 | 10/2014 | Bart et al. |
| 2014/0359761 | A1 | 12/2014 | Altman et al. |
| 2015/0067835 | A1 | 3/2015 | Chari et al. |
| 2015/0081431 | A1 | 3/2015 | Akahoshi et al. |
| 2015/0161394 | A1 | 6/2015 | Ferragut et al. |
| 2015/0163121 | A1 | 6/2015 | Mahaffey et al. |
| 2015/0172300 | A1 | 6/2015 | Cochenour |
| 2015/0180893 | A1 | 6/2015 | Im et al. |
| 2015/0213358 | A1 | 7/2015 | Shelton et al. |
| 2015/0286819 | A1 | 10/2015 | Coden et al. |
| 2015/0310195 | A1 | 10/2015 | Bailor et al. |
| 2015/0319185 | A1 | 11/2015 | Kirti et al. |
| 2015/0332054 | A1 | 11/2015 | Eck et al. |
| 2015/0341379 | A1 | 11/2015 | Lefebvre et al. |
| 2015/0363699 | A1 | 12/2015 | Nikovski |
| 2015/0379110 | A1 | 12/2015 | Marvasti et al. |
| 2016/0062950 | A1 | 3/2016 | Brodersen et al. |
| 2016/0078365 | A1 | 3/2016 | Baumard |
| 2016/0149941 | A1 | 5/2016 | Thakur et al. |
| 2016/0164902 | A1 | 6/2016 | Moore |
| 2016/0173509 | A1 | 6/2016 | Ray et al. |
| 2016/0241576 | A1 | 8/2016 | Rathod et al. |
| 2016/0352768 | A1 | 12/2016 | Lefebvre et al. |
| 2016/0359695 | A1 | 12/2016 | Yadav et al. |
| 2016/0373476 | A1 | 12/2016 | Dell'Anno et al. |
| 2017/0054745 | A1 | 2/2017 | Zhang et al. |
| 2017/0063907 | A1 | 3/2017 | Muddu et al. |
| 2017/0063910 | A1 | 3/2017 | Muddu et al. |
| 2017/0063911 | A1 | 3/2017 | Muddu et al. |
| 2017/0118236 | A1 | 4/2017 | Devi Reddy et al. |
| 2017/0169360 | A1 | 6/2017 | Veeramachaneni et al. |
| 2017/0220801 | A1 | 8/2017 | Stockdale et al. |
| 2017/0230391 | A1 | 8/2017 | Ferguson et al. |
| 2017/0230392 | A1 | 8/2017 | Stockdale |
| 2017/0251012 | A1 | 8/2017 | Stockdale et al. |
| 2017/0262633 | A1 | 9/2017 | Miserendino et al. |
| 2017/0270422 | A1 | 9/2017 | Sorakado |
| 2018/0027006 | A1 | 1/2018 | Zimmermann et al. |
| 2018/0048661 | A1* | 2/2018 | Bird .................. H04L 63/1416 |
| 2018/0167402 | A1 | 6/2018 | Scheidler et al. |

(56) References Cited

U.S. PATENT DOCUMENTS

2018/0367561 A1* 12/2018 Givental .............. G06F 21/552
2019/0190945 A1*  6/2019 Jang ................... H04L 63/1425

FOREIGN PATENT DOCUMENTS

| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |

OTHER PUBLICATIONS

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.

Marek Zachara et al., "Detecting Unusual User Behavior to Identify Hijacked Internet Auctions Accounts, " Lecture Notes in Computer Science, 2012, vol. 7465, Springer, Berlin, Heidelberg, Germany.

Massimiliano Albanese et al., "Computer-Aided Human Centric Cyber Situation Awareness," International Conference on Computer Analysis of Images and Patters, CAIP 2017: Computer Analysis of Images and Patterns, pp. 3-25.

\* cited by examiner

```
                    ┌─────────┐
                    │  Cont.  │
                    └────┬────┘
```

The Artificial Intelligence Cyber Security Analyst formats, presents a rank for, and outputs one or more supported possible cyber threat hypothesis from the possible set of cyber threat hypothesis into a formalized report, from a dynamic human-supplied and/or machine created template, that is outputted for a human user's consumption in a medium of any of 1) printable report, 2) presented digitally on a user interface, 3) in a machine readable format for further machine learning refinement, or 4) any of these three
408

The Artificial Intelligence Cyber Security Analyst generates a threat incident report in the formalized report from a multitude of templates corresponding to different types of cyber threats, each template, including the dynamic human-supplied and/or machine created template (e.g. the first template), corresponds to different types of cyber threats that vary in format, style, and standard fields in the multitude of templates. The analyst also populates a given template with relevant data, graphs, or other information as appropriate in various specified fields, along with a ranking of a likelihood of whether that hypothesis cyber threat is supported and its threat severity level for each of the supported cyber threat hypotheses, and then output the formatted threat incident report with the ranking of each supported cyber threat hypothesis, which is presented digitally on the user interface and/or printed as the printable report
410

The Artificial Intelligence Cyber Security Analyst has the trigger module, analyzer module and formatting module cooperate to improve the analysis and formalized report generation with less repetition to consume CPU cycles with greater efficiency than humans repetitively going through these steps and re duplicating steps to filter and rank the one or more supported possible cyber threat hypothesis from the possible set of cyber threat hypothesis
412

Fig. 4B

ARTIFICIAL INTELLIGENCE CYBER SECURITY ANALYST

RELATED APPLICATION

This application claims the benefit of priority under 35 USC 120 from U.S. patent application Ser. No. 16/278,918, filed Feb. 19, 2019 titled 'AN ARTIFICIAL INTELLIGENCE CYBER SECURITY ANALYST,' and issued as granted U.S. Pat. No. 11,336,669 on May 17, 2022, which claimed priority to and the benefit of under 35 USC 119 of U.S. provisional patent application titled "A cyber threat defense system with various improvements," filed Feb. 20, 2018, Ser. No. 62/632,623, which is incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the design provided herein generally relate to a cyber threat defense system. In an embodiment, Artificial Intelligence (AI) is applied to analyzing cyber security threats, where the AI does both the analysis and data gathering to assess cyber threats to the system.

BACKGROUND

In the cyber security environment, firewalls, endpoint security methods and other tools such as SIEMs and sandboxes are deployed to enforce specific policies, and provide protection against certain threats. These tools currently form an important part of an organization's cyber defense strategy, but they are insufficient in the new age of cyber threat. Legacy tools are failing to deal with new cyber threats because the traditional approach relies on being able to pre-define the cyber threat in advance, by writing rules or producing signatures. In today's environment, this approach to defend against cyber threats is fundamentally flawed:

Threats are constantly evolving—novel attacks do not match historical-attack "signatures", and even subtle changes to previously understood attacks can result in them going undetected by legacy defenses;

Rules and policies defined by organizations are continually insufficient—security teams simply can't imagine every possible thing that may go wrong in future; and Employee 'insider' threat is a growing trend—it is difficult to spot malicious employees behaving inappropriately as they are a legitimate presence on the business network.

The reality is that modern threats bypass the traditional legacy defense tools on a daily basis. These tools need a new tool based on a new approach that can complement them and mitigate their deficiencies at scale across the entirety of digital organizations. In the complex modern world, it is advantageous that the approach is fully automated as it is virtually impossible for humans to sift through the vast amount of security information gathered each minute within a digital business.

Over a given week in a large organization, thousands of incidents of abnormal behavior can be logged and need to be reported to a human cyber security analyst. To aid the human cyber security analyst, various blank dynamically human-supplied and/or machine created templates can be utilized.

SUMMARY

In an embodiment, an AI cyber security analyst protects a system, including but not limited to a network, from cyber threats. A trigger module may identify, with one or more AI models trained with machine learning on a normal behavior of the system, at least one of i) an abnormal behavior, ii) a suspicious activity, and iii) any combination of both, from one or more entities in the system. The analyzer module may form one or more hypotheses on what are a possible set of cyber threats that could include the identified abnormal behavior and/or suspicious activity from the trigger module with one or more AI models trained with machine learning on possible cyber threats. The analyzer module may analyze a collection of system data, including metrics data, to support or refute each of the one or more possible cyber threat hypotheses that could include the identified abnormal behavior and/or suspicious activity data with the one or more AI models trained with machine learning on possible cyber threats, where the analyzer module generates one or more supported possible cyber threat hypotheses from the possible set of cyber threat hypothesis with a score indicating the severity of each hypothesis. The formatting module may format an output of one or more supported possible cyber threat hypotheses from the analyzer module into a formalized report, from a first template, such as a dynamic human-supplied and/or machine created template, that is outputted for a human user's consumption in a medium of any of 1) printable report, 2) presented digitally on a user interface, or 3) both.

These and other features of the design provided herein can be better understood with reference to the drawings, description, and claims, all of which form the disclosure of this patent application.

DRAWINGS

The drawings refer to some embodiments of the design provided herein in which:

FIGS. 4A and 4B illustrate a block diagram of an embodiment of the AI cyber-security analyst protecting a system.

Figure 1A:
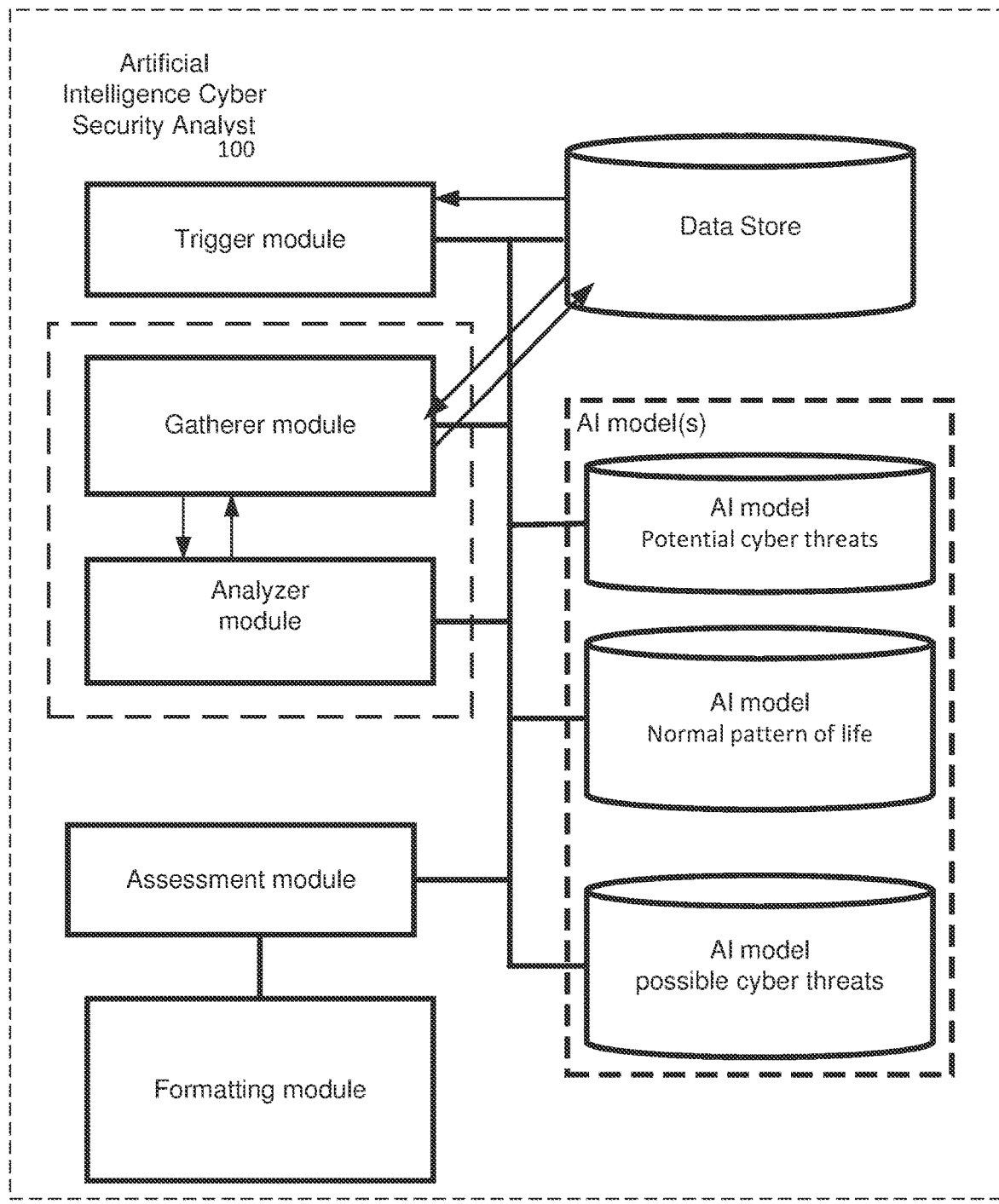
FIGS. 1A and 1B illustrate block diagrams of an embodiment of the AI cyber-security analyst to protect a system, including but not limited to a network, from cyber threats.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, the AI Cyber Security Analyst sees something abnormal or suspicious, then the AI Cyber Security analyst forms one or more hypotheses on what are the possibilities to cause this abnormal behavior or suspicious activity, then the AI Cyber Security analyst finds evidence/collects data to support or refute each possible hypothesis, assigns a threat level and an optional probability, and then generates a formal report.

With the real time speed of attacks and almost overwhelming volume of data within a system, this task of examining suspicious activities and/or abnormal behavior is very difficult for a human analyst to keep up with or perform; and thus, early detection of cyber threats may not occur until after the cyber threat has already caused significant harm.

Figure 1B:
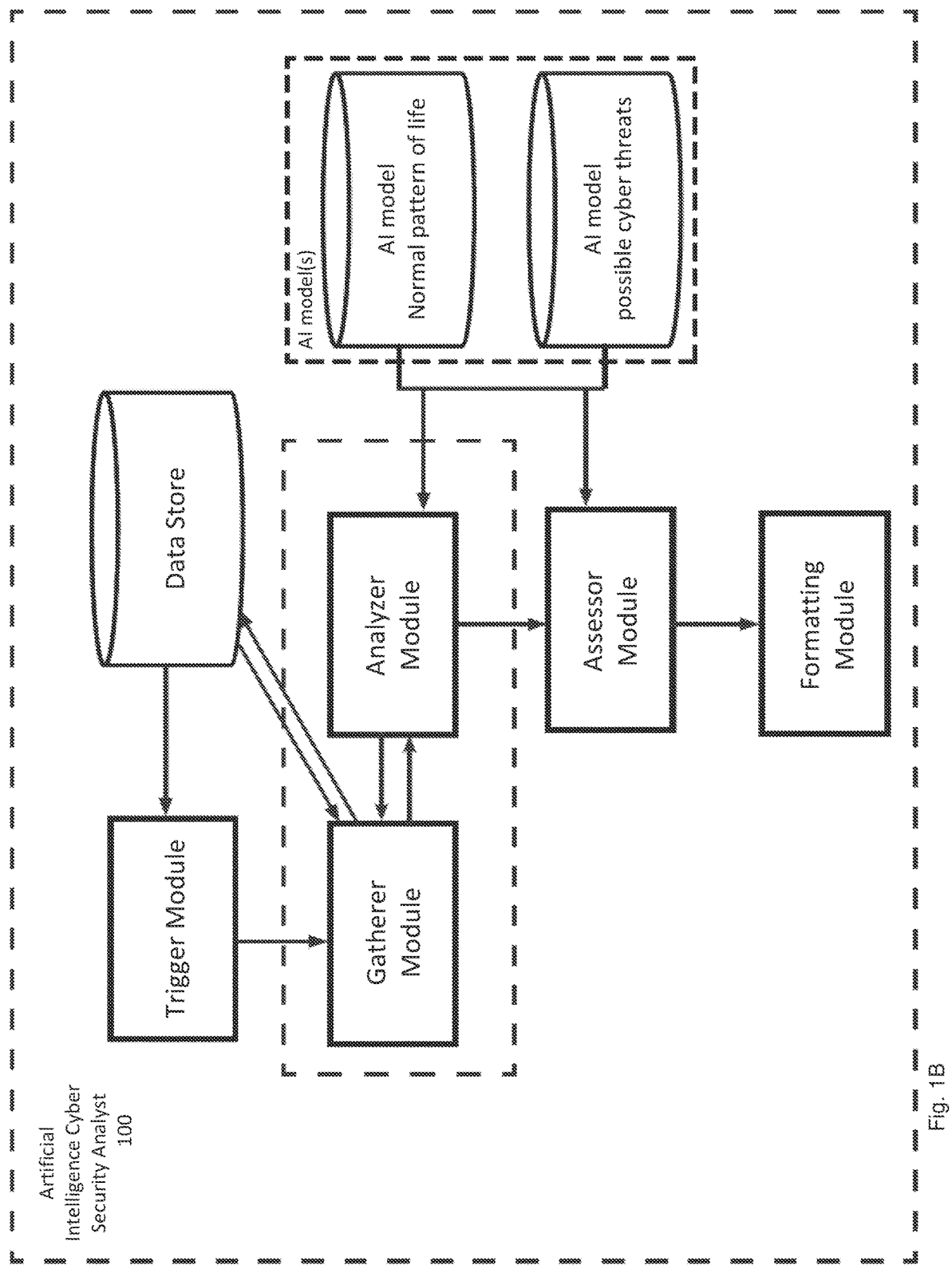

FIGS. 1A and 1B illustrate block diagrams of an embodiment of the AI cyber-security analyst to protect a system, including but not limited to a network, from cyber threats.

The AI cyber-security analyst 100 may include a trigger module, a gatherer module, an analyzer module, an assessment module, and an optional formatting module.

The trigger module may identify, with one or more AI models trained with machine learning on a normal behavior of the system, at least one of i) an abnormal behavior, ii) a suspicious activity, and iii) any combination of both, from one or more entities in the system.

The gatherer module may initiate a collection of data to support or refute each of the one or more possible cyber threat hypotheses that could include this abnormal behavior or suspicious activity by the one or more AI models trained on possible cyber threats.

The gatherer module may further extract data at the request of the analyzer module on each possible hypothetical threat that would include the abnormal behavior or suspicious activity and then filtering that collection of data down to relevant points of data to either 1) support or 2) refute each particular hypothesis of what the cyber threat, the suspicious activity and/or abnormal behavior relates to. The gatherer module may send the filtered down relevant points of data to either 1) support or 2) refute each particular hypothesis to the analyzer module, comprised of one or more algorithms used by the AI models trained with machine learning on possible cyber threats to make a determination on a probable likelihood of whether that particular hypothesis is supported or refuted.

The analyzer module configured to form one or more hypotheses on what are a possible set of activities including cyber threats that could include the identified abnormal behavior and/or suspicious activity from the trigger module with one or more AI models trained with machine learning on possible cyber threats. The analyzer module may request further data from the gatherer module to perform this analysis.

The analyzer module may further analyze a collection of system data, including metrics data, to support or refute each of the one or more possible cyber threat hypotheses that could include the identified abnormal behavior and/or suspicious activity data with the one or more AI models trained with machine learning on possible cyber threats, where the analyzer module generates one or more supported possible cyber threat hypotheses from the possible set of cyber threat hypotheses.

The assessment module may assign a probability, or confidence level, of a given cyber threat hypothesis that is supported and a threat level posed by that cyber threat hypothesis, which includes this abnormal behavior or suspicious activity, with the one or more AI models trained on possible cyber threats.

The formatting module may format, present a rank for, and output one or more supported possible cyber threat hypotheses from the analyzer module into a formalized report, from a first template, such as a dynamic human-supplied and/or machine created template, that can be outputted for a human user's consumption in a medium of any of 1) printable report, 2) presented digitally on a user interface, or 3) both, or in a machine readable format for further reinforcement machine learning.

The trigger module, analyzer module and formatting module cooperate to improve the analysis and formalized report generation with less repetition to consume CPU cycles more efficiently and effectively than humans repetitively going through these steps and re-duplicating steps to filter and rank the one or more supported possible cyber threat hypotheses from the possible set of cyber threat hypotheses.

The system may use at least three separate machine learning models. Each machine learning model may be trained on specific aspects of the normal pattern of life for the system such as devices, users, network traffic flow, outputs from one or more cyber security analysis tools analyzing the system, etc. One or more machine learning models may also be trained on characteristics and aspects of all manner of types of cyber threats.

Figure 2:
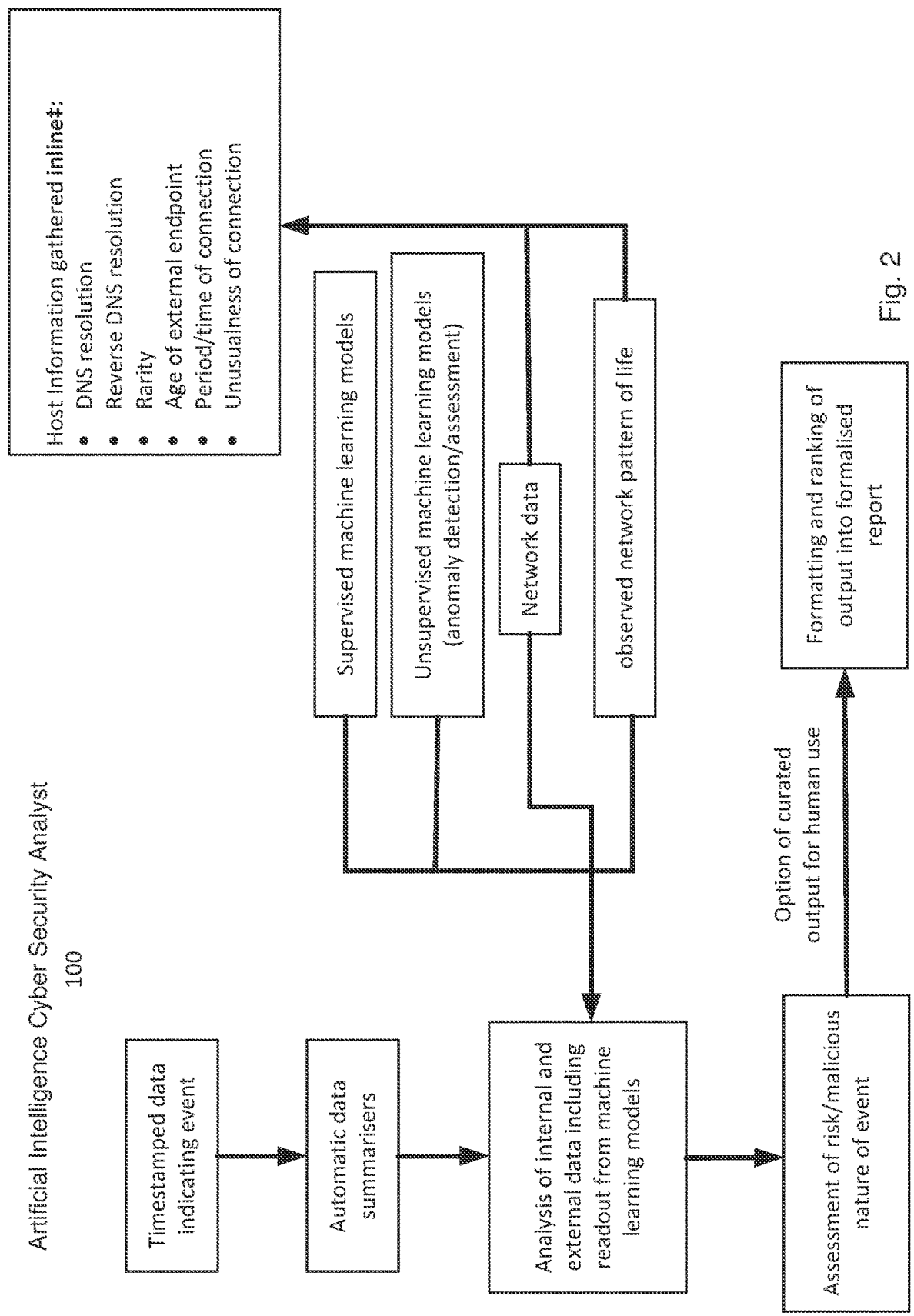
FIG. 2 illustrates a block diagram of an embodiment of the AI cyber-security analyst trained on threat intel gathered from a variety of sources including human cyber analysts, and synthesized and external threat data to assess, classify, report upon a cyber threat, and possibly recommend actions or take actions autonomously in response to this threat.

FIG. 2 illustrates a block diagram of an embodiment of the AI cyber-security analyst trained on threat intel gathered from a variety of sources including human cyber analysts, and synthesized and external threat data to assess, classify, report upon a cyber threat, and possibly recommend actions or take actions autonomously in response to this threat. Thus, the AI cyber-security analyst 100 automates the analysis and reporting of cybersecurity breaches to improve investigation efficiency and guide human users. The AI cyber-security analyst 100 functionality, as an assistant, increases the efficiency of a human cybersecurity analyst. The AI cyber-security analyst 100 provides an automatic triage and write up tool based upon learned behaviors, derived from the data input sources above, providing key investigation information to human operators.

The AI cyber-security analyst 100 can act as a mentor or coach to less experienced analysts who may be facing a similar cyber threat for the first time. The AI cyber-security analyst 100 does the initial analysis and then presents this analysis so that an investigation of potential cyber security threats can be performed quicker/with less repetition, and a Security Operations Center teams can be leaner and focus on interesting threats as a result. Moreover, AI cyber-security analyst 100 has a more reliable ability, than a human, to analyze all of the data and all of the possibilities to identify cyber threats, even a previously unknown or subtle threat, to speed up the all-round response times.

A trigger module may detect timestamped data indicating an event is occurring and then triggers that something unusual is happening. The gatherer module is triggered by specific events or alerts of i) an abnormal behavior, ii) a suspicious activity, and iii) any combination of both. The inline data may be gathered on the deployment when the traffic is observed. The scope and wide variation of data available in this location results in good quality data for analysis. The received data is passed to the cyber security analyst, which may be hosted on a device, on one or more servers, and/or in its own cyber threat appliance platform. (e.g. see FIG. 3)

The gatherer module may consist of multiple automatic data gatherers that each look at different aspects of the data depending on the particular hypothesis formed for the analyzed event. The data relevant to each type of possible hypothesis will be automatically pulled from additional external and internal sources. Some data is pulled or retrieved by the gatherer module for each possible hypothesis. A feedback loop of cooperation between the gatherer module and the analyzer module may be used to apply one or more models trained on different aspects of this process. Each hypothesis of typical threats, human user insider attack/inappropriate network behavior, malicious software/ malware attack/inappropriate network behavior, can have various supporting points of data and other metrics associated with that possible threat, and a machine learning algorithm will look at the relevant points of data to support or refute that particular hypothesis of what the suspicious activity and/or abnormal behavior related for each hypothesis on what the suspicious activity and/or abnormal behavior relates to. Networks have a wealth of data and metrics that can be collected and then the mass of data is filtered/ condensed down into the important features/salient features of data by the gatherers.

The analyzer module uses one or more AI models trained through complex machine-learning techniques on a behavior and input of how a plurality of human cyber security analysts make a decision and analyze a risk level regarding and a probability of a potential cyber threat. The AI model learns how expert humans tackle investigations into specific real and synthesized cyber threats.

The gatherer module may use a set of scripts to extract data on each possible hypothetical threat to supply to the analyzer module. The gatherer module may use a plurality of scripts to walk through a step by step process of what to collect to filter down to the relevant data points (from the potentially millions of data points occurring in the network) to make a decision what is required by the analyzer module to analyze possible cyber threats with one or more AI models trained with machine learning on a process of human analyzing on possible cyber threats and the relevant data points human analysts examine to support or rebut their analysis of a given cyber threat hypothesis.

The gatherer module may gather data associated with a window of time in which the abnormal behavior or a suspicious activity occurs and when multiple occurrences occur, and then filter that data for each occurrence instance to assess cyber threats to the system.

The analyzer module may get threat information from Open Source APIs as well as from databases as well as information trained into AI models.

The analyzer module learns how expert humans tackle investigations into specific cyber threats. The analyzer module may use i) one or more AI models and/or ii) rules based models and iii) combinations of both that are deployed onto one or more servers or can be hosted within a separate plug-in appliance connecting to the network.

The AI models use data sources such as simulations, database records, and actual monitoring of different human exemplar cases as input to train the AI model on how to make a decision. The analyzer module also may utilize repetitive feedback, as time goes on, for the AI models trained with machine learning on possible cyber threats via reviewing a subsequent resulting analysis of the supported possible cyber threat hypothesis and supply that information to the training of the AI models trained with machine learning on possible cyber threats in order to reinforce the model's finding as correct or inaccurate.

The analyzer module looks at different aspects of the data from multiple sources depending on the hypothesis formed for the analyzed event. Some data is pulled or retrieved by the gatherer module for each possible hypothesis. Each hypothesis has various supporting points of data and other metrics associated with that possible threat, and a machine learning algorithm will look at the relevant points of data to support or refute that particular hypothesis of what the suspicious activity and/or abnormal behavior relates to.

The analyzer module may perform analysis of internal and external data including readout from machine learning models, which output a likelihood of the suspicious activity and/or abnormal behavior related for each hypothesis on what the suspicious activity and/or abnormal behavior relates to with other supporting data to support or refute that hypothesis.

In an example, a behavioral pattern analysis of what are the unusual behaviors of the network/system/device/user under analysis by the machine learning models may be as follows. The a cyber defense system uses unusual behavior deviating from the normal behavior and then builds a chain of unusual behavior and the causal links between the chain of unusual behavior to detect cyber threats. The unusual pattern is determined by filtering out what activities/events/ alerts that fall within the window of what is the normal pattern of life for that network/system/device/user under analysis, and then the pattern of the behavior of the activities/events/alerts that are left, after the filtering, can be analyzed to determine whether that pattern is indicative of a behavior of a malicious actor—human, program, or other threat. The cyber defense system can go back and pull in some of the filtered out normal activities to help support or refute a possible hypothesis of whether that pattern is indicative of a behavior of a malicious actor. If the pattern of behaviors under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber defense system is configurable in a user interface by each different user, enabling what type of automatic response actions, if any, the cyber defense system may take when for different types of cyber threats that are equal to or above a configurable level of threat posed by this malicious actor indicated by the pattern of behaviors under analysis.

The analyzer module may rank supported candidate cyber threat hypotheses by combination of a likelihood that this candidate cyber threat hypothesis is supported as well as severity threat level of this incident type. These factors are combined to create a total ordering possible cyber threat hypotheses presented in the formalized report on the user interface, where a filtering out of refuted cyber threat hypotheses and putting higher supported and more severe threat level possible cyber threat hypotheses higher in the total ordering of possible cyber threat hypotheses allows cyber personnel to better focus on interesting cyber threats that could include the identified abnormal behavior and/or suspicious activity data.

The analyzer module may rank threat hypothesis candidates by analyzing data (for an appropriate trigger) collected by the gatherer module. During analysis, the analyzer instance may carry out various forms of data processing and initiate further requests for data using the gatherer module. Upon analysis completion, each analyzer instance ranks incidents by a severity level of that threat and an optional hypothesis confidence level. The analyzer instances can be, but are not limited to, a combination of supervised machine learning classifiers trained on labelled data, unsupervised machine learning/anomaly detection, or hard-coded logic.

The analyzer module may group potential threat hypothesis candidates that have common unusual events and/or alerts including suspicious activity and/or abnormal behavior. The analyzer module may map groups and their individual members of potential threat hypothesis candidates to incident types. The grouping of potential threats may be performed by four paradigms as appropriate for the threat and/or device type:
  a. Unique incident
  b. Repeating incident for device
  c. Network wide incidents for the specific hypothesis.
  d. Incidents occurring on same device around the same time.

Various incident types can have range of risk and threat severity associated with that malicious threat.

The analyzer module may analyze various example factors:
  Host information gathered inline;
  DNS resolution including destination address or irregular source address initiating that request;
  Reverse DNS resolution;
  Rarity;
  Age of external endpoint;
  Period/time of connection;
  Unusualness of connection: first time connections, unusual port used, unusual size of transfer, weird time of day for this event to occur, unusual to see this type of data sent to this particular outside domain or downloaded on this type of user's machine,
  Specific connections, DNS requests and notices in event logs type of commands or communications occurring;
  Host name is odd; and other similar factor The analyzer module may be configured to use both
  1) one or more supervised machine learning models trained on agnostic examples of past history of detection of each possible type of cyber threat hypothesis previously analyzed by human cyber threat analysis, and
  2) one or more unsupervised machine learning models trained to perform anomaly detection verses a normal pattern of life to determine whether the abnormal behavior and/or suspicious activity is malicious or benign when the cyber threat is previously unknown.

The supervised machine learning models use innovative, optimal Machine Learning techniques and quality sources of data to train them. The data ingested and derived from observation of human analysts. The supervised machine learning models use a wide scope and/or wide variation of data (with good quality data) to start the machine learning process to produce strong enough learning to think the output will be valuable or useful to an analyst user. The supervised machine learning models use deep learning and reinforcement learning.

Once the AI cyber-security analyst 100 has decided an incident is reportable, the formatting module may generate a textual write up of an incident report in a human readable, formalized report format for a wide range of breaches of normal behavior, used by the AI models trained with machine learning on the normal behavior of the system. This formalized report may be derived from human supplied textual content and/or analyzing previous reports with one or more models trained with machine learning on assessing and populating relevant data into the incident report corresponding to each possible cyber threat.

The formatting module may generate a threat incident report in the formalized report from a multitude of dynamic templates corresponding to different types of cyber threats, each template corresponding to different types of cyber threats that vary in format, style, and standard fields in the multitude of templates. Each incident type may have a corresponding human supplied write-up frame or a dynamic write-up frame derived from machine learning models trained on existing incident reports.

The formatting module may be further configured to populate a given template with relevant data, graphs, or other information as appropriate in various specified fields, along with an optional ranking of a likelihood of whether that hypothesis cyber threat is supported and a threat severity level for each of the supported cyber threat hypotheses, and then output the formatted threat incident report with the ranking of each supported cyber threat hypothesis, which is presented digitally on the user interface and/or printed as the printable report.

The formatting module may show relevant information to help the user decide whether to include each incident. The formalized report may be output as a threat intelligence report document in a human readable format. The formalized incident data can also be outputted in machine readable format for further machine learning and reinforcement using the processed incident data.

The formatting module may complete the report, placing any relevant graphs, details, and text into the threat intelligence report.

The formatting module generates fully automated summary reports that are automatically produced on appliance for human verification and final editing.

Figure 3:
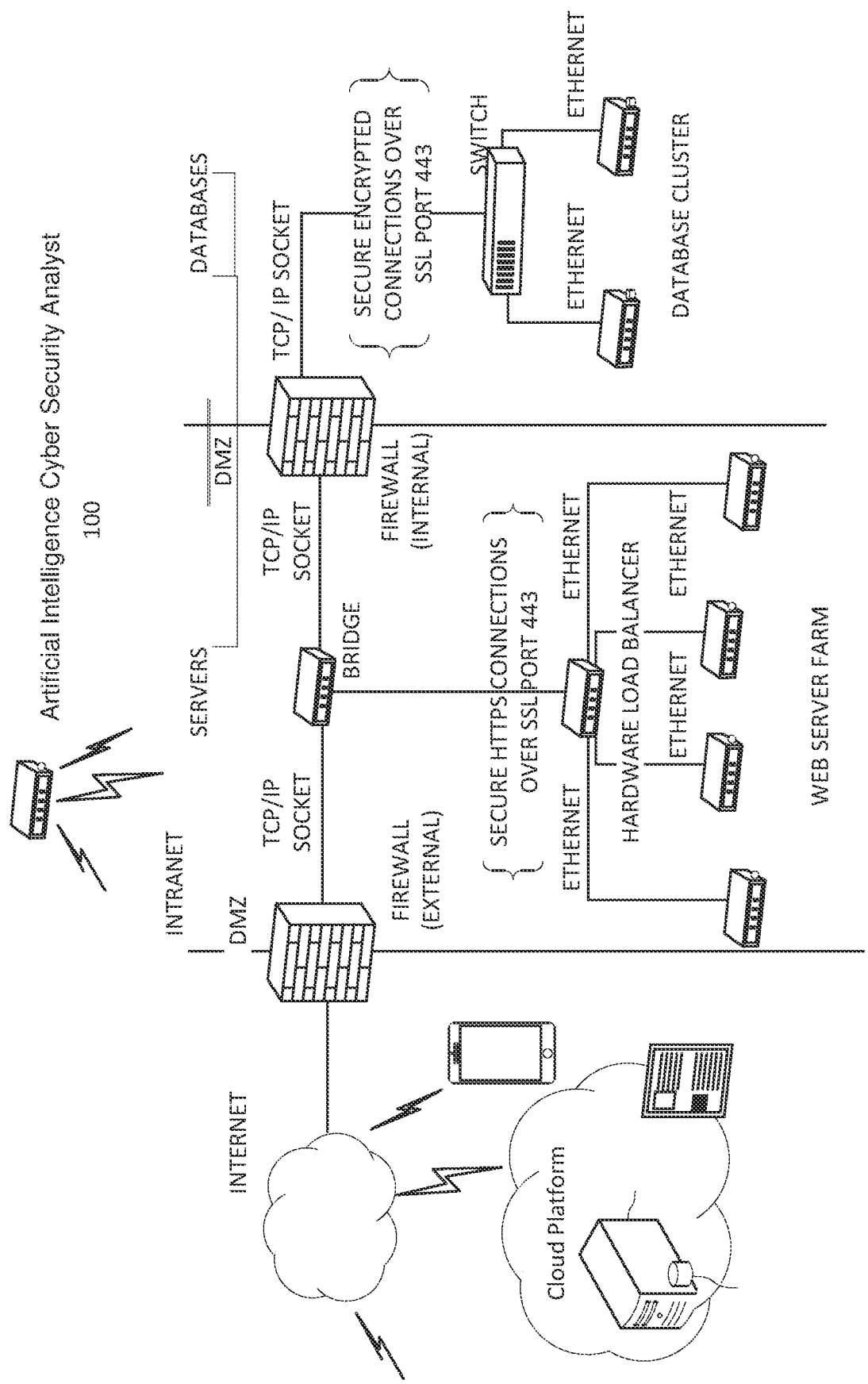
FIG. 3 illustrates a block diagram of an embodiment of the AI cyber-security analyst plugging in as an appliance platform to protect a system.

FIG. 3 illustrates a block diagram of an embodiment of the AI cyber-security analyst 100 plugging in as an appliance platform to protect a system.

Figure 4A:
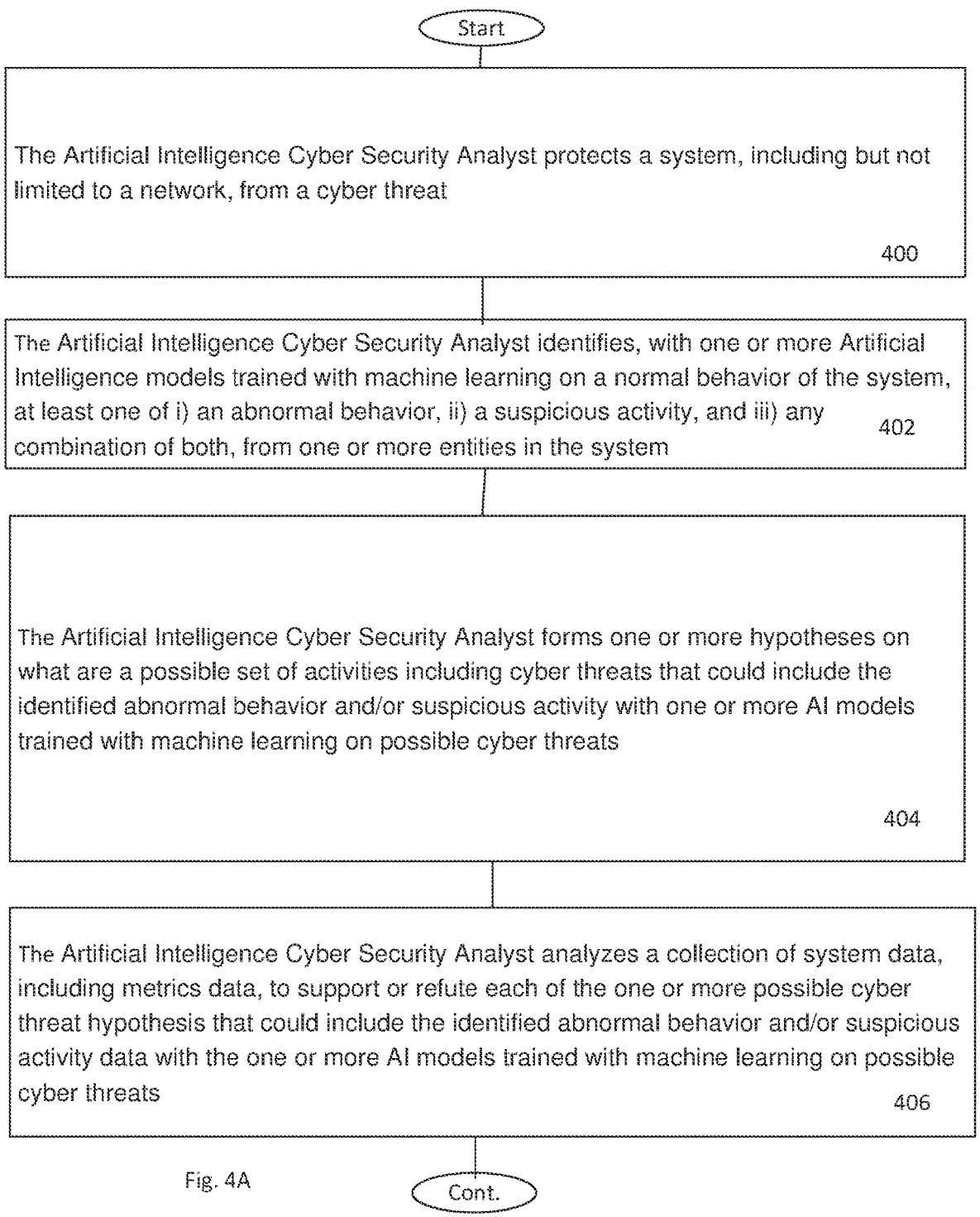

FIGS. 4A and 4B illustrate a block diagram of an embodiment of the AI cyber-security analyst protecting a system. The below steps need not be performed in order where logically possible.

In step 400, the AI cyber-security analyst protects a system, including but not limited to a network, from a cyber threat.

In step 402, the AI cyber-security analyst identifies, with one or more AI models trained with machine learning on a normal behavior of the system, at least one of i) an abnormal behavior, ii) a suspicious activity, and iii) any combination of both, from one or more entities in the system.

In step 404, the AI cyber-security analyst forms one or more hypotheses on what are a possible set of activities including cyber threats that could include the identified abnormal behavior and/or suspicious activity with one or more AI models trained with machine learning on possible cyber threats.

In step 406, the AI cyber-security analyst analyzes a collection of system data, including metrics data, to support or refute each of the one or more possible cyber threat hypotheses that could include the identified abnormal behavior and/or suspicious activity data with the one or more AI models trained with machine learning on possible cyber threats.

In step 408, the AI cyber-security analyst formats, presents a rank for, and outputs one or more supported possible cyber threat hypotheses from the possible set of cyber threat hypothesis into a formalized report, from a first template, such as a dynamic human-supplied and/or machine created template, that is outputted for a human user's consumption in a medium of any of 1) printable report, 2) presented digitally on a user interface, 3) in a machine readable format for further machine learning refinement, or 4) any of these three.

In step 410, the AI cyber-security analyst generates a threat incident report in the formalized report from a multitude of templates corresponding to different types of cyber threats, each template, including the dynamic human-supplied and/or machine created template (e.g. the first template), corresponds to different types of cyber threats that vary in format, style, and standard fields in the multitude of templates. The analyst also populates a given template with relevant data, graphs, or other information as appropriate in various specified fields, along with a ranking of a likelihood of whether that hypothesis cyber threat is supported and its threat severity level for each of the supported cyber threat hypotheses, and then output the formatted threat incident report with the ranking of each supported cyber threat hypothesis, which is presented digitally on the user interface and/or printed as the printable report.

In step 412, the AI cyber-security analyst has the trigger module, analyzer module and formatting module cooperate to improve the analysis and formalized report generation with less repetition to consume CPU cycles with greater efficiency than humans repetitively going through these steps and re duplicating steps to filter and rank the one or more supported possible cyber threat hypotheses from the possible set of cyber threat hypothesis.

Figure 5:
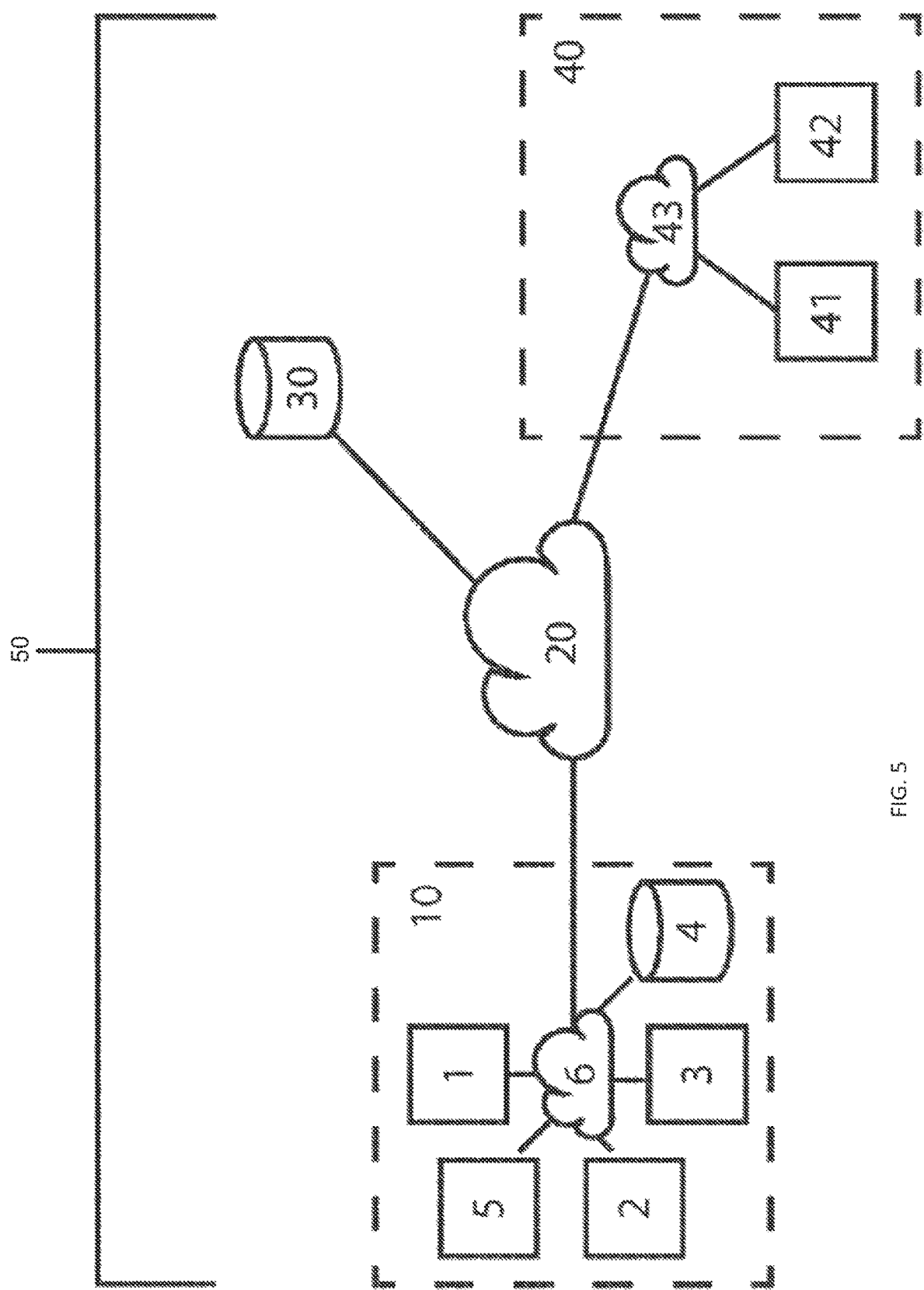
FIG. 5 illustrates an example cyber threat defense system using an AI cyber-security analyst to protect an example network.

FIG. 5 illustrates an example cyber threat defense system using an AI cyber-security analyst to protect an example network. The example network FIG. 5 illustrates a network of computer systems 50 using a threat detection system. The system depicted by FIG. 5 is a simplified illustration, which is provided for ease of explanation of the invention. The system 50 comprises a first computer system 10 within a building, which uses the threat detection system to detect and thereby attempt to prevent threats to computing devices within its bounds. The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices including server 30 and second computer system 40. Second computer system 40 also includes two computers 41, 42, connected by a second LAN 43.

In this exemplary embodiment of the invention, computer 1 on the first computer system 10 has the threat detection system and therefore runs the threat detection method for detecting threats to the first computer system. As such, it comprises a processor arranged to run the steps of the process described herein, memory required to store information related to the running of the process, as well as a network interface for collecting the required information. This method shall now be described in detail with reference to FIG. 5.

The computer 1 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9.30 AM and midday, and is active from about 8:30 AM until 6 PM. The same employee virtually never accesses the employee time sheets, very rarely connects to the company's Atlanta network and has no dealings in South-East Asia. The threat detection system takes all the information that is available relating to this employee and establishes a 'pattern of life' for that person, which is dynamically updated as more information is gathered. The 'normal' model is used as a moving benchmark, allowing the system to spot behavior on a system that seems to fall outside of this normal pattern of life, and flags this behavior as anomalous, requiring further investigation.

The threat detection system is built to deal with the fact that today's attackers are getting stealthier and an attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, in an attempt to defeat a relatively-simple policing process. These sophisticated attackers look for activity that is not directly associated with the user's input. As an APT (Advanced Persistent Threat) attack typically has very long mission windows of weeks, months or years, such processor cycles can be stolen so infrequently that they do not impact machine performance. But, however cloaked and sophisticated the attack is, there will always be a measurable delta, even if extremely slight, in typical machine behavior, between pre and post compromise. This behavioral delta can be observed and acted on with the form of Bayesian mathematical analysis used by the threat detection system installed on the computer 1.

The cyber defense self-learning platform uses machine-learning technology. The machine learning technology, using advanced mathematics, can detect previously unidentified threats, without rules, and automatically defend networks. Note, today's attacks can be of such severity and speed that a human response cannot happen quickly enough. Thanks to these self-learning advances, it is now possible for a machine to uncover emerging threats and deploy appropriate, real-time responses to fight back against the most serious cyber threats.

The cyber threat defense system builds a sophisticated 'pattern of life'—that understands what represents normality for every person, device, and network activity in the system being protected by the cyber threat defense system.

The threat detection system has the ability to self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine and human activity behaviorally, at and after the point of compromise, in order to predict and catch today's increasingly sophisticated cyber-attack vectors. It is thus possible to computationally establish what is normal, in order to then detect what is abnormal.

This intelligent system is capable of making value judgments and carrying out higher value, more thoughtful tasks. Machine learning requires complex algorithms to be devised and an overarching framework to interpret the results produced. However, when applied correctly these approaches can facilitate machines to make logical, probability-based decisions and undertake thoughtful tasks.

Advanced machine learning is at the forefront of the fight against automated and human-driven cyber-threats, overcoming the limitations of rules and signature-based approaches:

The machine learning learns what is normal within a network—it does not depend upon knowledge of previous attacks.

The machine learning thrives on the scale, complexity and diversity of modern businesses, where every device and person is slightly different.

The machine learning turns the innovation of attackers against them—any unusual activity is visible.

The machine learning constantly revisits assumptions about behavior, using probabilistic mathematics.

The machine learning is always up to date and not reliant on human input. Utilizing machine learning in cyber security technology is difficult, but when correctly implemented it is extremely powerful. The machine learning means that previously unidentified threats can be detected, even when their manifestations fail to trigger any rule set or signature. Instead, machine learning allows the system to analyze large sets of data and learn a 'pattern of life' for what it sees.

Machine learning can approximate some human capabilities to machines, such as:

Thought: it uses past information and insights to form its judgments;

Real time: the system processes information as it goes; and

Self-improving: the model's machine learning understanding is constantly being challenged and adapted, based on new information.

New unsupervised machine learning therefore allows computers to recognize evolving threats, without prior warning or supervision.

Unsupervised Machine Learning

Unsupervised learning works things out without pre-defined labels. In the case of sorting the series of different animals, the system analyzes the information and works out the different classes of animals. This allows the system to handle the unexpected and embrace uncertainty. The system does not always know what it is looking for, but can independently classify data and detect compelling patterns.

The cyber threat defense system's unsupervised machine learning methods do not require training data with pre-defined labels. Instead, they are able to identify key patterns and trends in the data, without the need for human input. The advantage of unsupervised learning is that it allows computers to go beyond what their programmers already know and discover previously unknown relationships.

The cyber threat defense system uses unique implementations of unsupervised machine learning algorithms to analyze network data at scale, intelligently handle the unexpected, and embrace uncertainty. Instead of relying on knowledge of past threats to be able to know what to look for, it is able to independently classify data and detect compelling patterns that define what may be considered to be normal behavior. Any new behaviors that deviate from those, which constitute this notion of 'normality,' may indicate threat or compromise. The impact of the cyber threat defense system's unsupervised machine learning on cyber security is transformative:

Threats from within, which would otherwise go undetected, can be spotted, highlighted, contextually prioritized and isolated using these algorithms.

The application of machine learning has the potential to provide total network visibility and far greater detection levels, ensuring that networks have an internal defense mechanism.

Machine learning has the capability to learn when to action automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine learning is extremely complex and difficult to get right. Robust, dependable algorithms are developed, with a scalability that enables their successful application to real-world environments.

Overview

In an embodiment, a closer look at the cyber threat defense system's machine learning algorithms and approaches is as follows.

The cyber threat defense system's probabilistic approach to cyber security is based on a Bayesian framework. This allows it to integrate a huge number of weak indicators of potentially anomalous network behavior to produce a single clear measure of how likely a network device is to be compromised. This probabilistic mathematical approach provides an ability to understand important information, amid the noise of the network—even when it does not know what it is looking for.

Ranking Threats

Crucially, the cyber threat defense system's approach accounts for the inevitable ambiguities that exist in data, and distinguishes between the subtly differing levels of evidence that different pieces of data may contain. Instead of generating the simple binary outputs 'malicious' or 'benign,' the cyber threat defense system's mathematical algorithms produce outputs that indicate differing degrees of potential compromise. This output enables users of the system to rank different alerts in a rigorous manner and prioritize those that most urgently require action, simultaneously removing the problem of numerous false positives associated with a rule-based approach.

At its core, the cyber threat defense system mathematically characterizes what constitutes 'normal' behavior based on the analysis of a large number/set of different measures of a devices network behavior, examples include:
Server access;
Data access;
Timings of events;
Credential use;
DNS requests; and
other similar parameters.
Each measure of network behavior is then monitored in real time to detect anomalous behaviors.

Clustering

To be able to properly model what should be considered as normal for a device, its behavior must be analyzed in the context of other similar devices on the network. To accomplish this, the cyber threat defense system leverages the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods including matrix based clustering, density based clustering and hierarchical clustering techniques. The resulting clusters are then used to inform the modeling of the normative behaviors of individual devices.

Clustering: At a glance:
Analyzes behavior in the context of other similar devices on the network;
Algorithms identify naturally occurring groupings of devices—impossible to do manually; and
Simultaneously runs a number of different clustering methods to inform the models.

Network Topology

Any cyber threat detection system must also recognize that a network is far more than the sum of its individual parts, with much of its meaning contained in the relationships among its different entities, and that complex threats can often induce subtle changes in this network structure. To capture such threats, the cyber threat defense system employs several different mathematical methods in order to be able to model multiple facets of a networks topology.

One approach is based on iterative matrix methods that reveal important connectivity structures within the network. In tandem with these, the cyber threat defense system has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise LAN, WAN and Cloud is difficult because both input and output can contain many inter-related features (protocols, source and destination machines, log changes and rule triggers, etc.). Learning a sparse and consistent structured predictive function is crucial to avoid the curse of over fitting.

In this context, the cyber threat defense system has employed a cutting edge large-scale computational approach to learn sparse structure in models of network behavior and connectivity based on applying L1-regulation techniques (e.g. a lasso method). This allows for the discovery of true associations between different network components and events that can be cast as efficiently solvable convex optimization problems and yield parsimonious models.

Recursive Bayesian Estimation

To combine these multiple analyses of different measures of network behavior to generate a single comprehensive picture of the state of each device, the cyber threat defense system takes advantage of the power of Recursive Bayesian Estimation (RBE) via an implementation of the Bayes filter.

Using RBE, the cyber threat defense system's mathematical models are able to constantly adapt themselves, in a computationally efficient manner, as new information becomes available to the system. They continually recalculate threat levels in the light of new evidence, identifying changing attack behaviors where conventional signature-based methods fall down.

The cyber threat defense system's innovative approach to cyber security has pioneered the use of Bayesian methods for tracking changing device behaviors and computer network structures. The core of the cyber threat defense system's mathematical modeling is the determination of normative behavior, enabled by a sophisticated software platform that allows for its mathematical models to be applied to new network data in real time. The result is a system that is able to identify subtle variations in machine events within a computer networks behavioral history that may indicate cyber-threat or compromise.

The cyber threat defense system uses mathematical analysis and machine learning to detect potential threats, allowing the system to stay ahead of evolving risks. The cyber threat defense system approach means that detection no longer depends on an archive of previous attacks. Instead, attacks can be spotted against the background understanding of what represents normality within a network. No pre-definitions are needed, which allows for the best possible insight and defense against today's threats. On top of the detection capability, the cyber threat defense system can create digital antibodies automatically, as an immediate response to the most threatening cyber breaches. The cyber threat defense system approach both detects and defends against cyber threat. Genuine unsupervised machine learning eliminates the dependence on signature-based approaches to cyber security, which are not working. The cyber threat defense system's technology can become a vital tool for security teams attempting to understand the scale of their network, observe levels of activity, and detect areas of potential weakness. These no longer need to be manually sought out, but are flagged by the automated system and ranked in terms of their significance.

Machine learning technology is the fundamental ally in the defense of systems from the hackers and insider threats of today, and in formulating response to unknown methods of cyber-attack. It is a momentous step change in cyber security. Defense must start within.

An Example Method

The threat detection system shall now be described in further detail with reference to a flow of the process carried out by the threat detection system for automatic detection of cyber threats through probabilistic change in normal behavior through the application of an unsupervised Bayesian mathematical model to detect behavioral change in computers and computer networks.

The core threat detection system is termed the 'Bayesian probabilistic'. The Bayesian probabilistic is a Bayesian system of automatically determining periodicity in multiple time series data and identifying changes across single and multiple time series data for the purpose of anomalous behavior detection.

Human, machine or other activity is modeled by initially ingesting data from a number of sources at step S1 and deriving second order metrics at step S2 from that raw data.

The raw data sources include, but are not limited to:
Raw network IP traffic captured from an IP or other network TAP or SPAN port;
Machine generated log files;
Building access ("swipe card") systems;
IP or non IP data flowing over an Industrial Control System (ICS) distributed network;
Individual machine, peripheral or component power usage;
Telecommunication signal strength; and/or
Machine level performance data taken from on-host sources (CPU usage/memory usage/disk usage/disk free space/network usage/etc.)

From these raw sources of data, a large number of metrics can be derived each producing time series data for the given metric. The data are bucketed into individual time slices (for example, the number observed could be counted per 1 second, per 10 seconds or per 60 seconds), which can be combined at a later stage where required to provide longer range values for any multiple of the chosen internal size. For example, if the underlying time slice chosen is 60 seconds long, and thus each metric time series stores a single value for the metric every 60 seconds, then any new time series data of a fixed multiple of 60 seconds (120 seconds, 180 seconds, 600 seconds etc.) can be computed with no loss of accuracy. Metrics are chosen directly and fed to the Bayesian probabilistic by a lower order model which reflects some unique underlying part of the data, and which can be derived from the raw data with particular domain knowledge. The metrics that are obtained depends on the threats that the system is looking for. In order to provide a secure system, it is common for a large number of metrics relating to a wide range of potential threats to be obtained. Communications from components in the network contacting known suspect domains.

The actual metrics used are largely irrelevant to the Bayesian probabilistic system, which is described here, but some examples are provided below.

Metrics derived from network traffic could include data such as:
The number of bytes of data entering or leaving a networked device per time interval.
File access.
The commonality/rarity of a communications process
Invalid SSL certification.
Failed authorization attempt.
Email access patterns.

In the case where TCP, UDP or other Transport Layer IP protocols are used over the IP network, and in cases where alternative Internet Layer protocols are used (e.g. ICMP, IGMP), knowledge of the structure of the protocol in use and basic packet header analysis can be utilized to generate further metrics, such as:
The number of multicasts per time interval originating from a networked device and intended to reach publicly addressable IP ranges.
The number of internal link-local IP Broadcast requests originating from a networked device.
The size of the packet payload data.
The number of individual TCP connections made by a device, or data transferred by a device, either as a combined total across all destinations or to any definable target network range, (e.g. a single target machine, or a specific network range)

In the case of IP traffic, in the case where the Application Layer protocol can be determined and analyzed, further types of time series metric can be defined, for example:
The number of DNS requests a networked device generates per time interval, again either to any definable target network range or in total.
The number of SMTP, POP or IMAP logins or login failures a machine generates per time interval.
The number of LDAP logins or login failures a generated.
Data transferred via file sharing protocols such as SMB, SMB2, FTP, etc.
Logins to Microsoft Windows Active Directory, SSH or Local Logins to Linux or Unix Like systems, or other authenticated systems such as Kerberos.

The raw data required to obtain these metrics may be collected via a passive fiber or copper connection to the networks internal switch gear, from virtual switching implementations, from cloud based systems, or from communicating devices themselves. Ideally the system receives a copy of every communications packet to provide full coverage of an organization.

For other sources, a number of domain specific time series data are derived, each chosen to reflect a distinct and identifiable facet of the underlying source of the data, which in some way reflects the usage or behavior of that system over time.

Many of these time series data are extremely sparse, and have the vast majority of data points equal to 0. Examples would be employee's using swipe cards to access a building or part of a building, or user's logging into their workstation, authenticated by Microsoft Windows Active Directory Server, which is typically performed a small number of times per day. Other time series data are much more populated, for example the size of data moving to or from an always-on Web Server, the Web Servers CPU utilization, or the power usage of a photocopier.

Regardless of the type of data, it is extremely common for such time series data, whether originally produced as the result of explicit human behavior or an automated computer or other system to exhibit periodicity, and have the tendency for various patterns within the data to recur at approximately regular intervals. Furthermore, it is also common for such data to have many distinct but independent regular time periods apparent within the time series.

At step S3, detectors carry out analysis of the second order metrics. Detectors are discrete mathematical models that implement a specific mathematical method against different sets of variables with the target network. For example, HMM may look specifically at the size and transmission time of packets between nodes. The detectors are provided in a hierarchy that is a loosely arranged pyramid of models. Each detector model effectively acts as a filter and passes its output to another model higher up the pyramid. At the top of the pyramid is the Bayesian probabilistic that is the ultimate threat decision making model. Lower order detectors each monitor different global attributes or 'features' of the underlying network and or computers. These attributes consist of value over time for all internal computational features such as packet velocity and morphology, endpoint file system values, and TCP/IP protocol timing and events. Each detector is specialized to record and make decisions on different environmental factors based on the detectors own internal mathematical model such as an HMM.

While the threat detection system may be arranged to look for any possible threat, in practice the system may keep watch for one or more specific threats depending on the network in which the threat detection system is being used. For example, the threat detection system provides a way for known features of the network such as desired compliance and Human Resource policies to be encapsulated in explicitly defined heuristics or detectors that can trigger when in concert with set or moving thresholds of probability abnormality coming from the probability determination output. The heuristics are constructed using complex chains of weighted logical expressions manifested as regular expressions with atomic objects that are derived at run time from the output of data measuring/tokenizing detectors and local contextual information. These chains of logical expression are then stored in and/or on online libraries and parsed in real-time against output from the measures/tokenizing detectors. An example policy could take the form of "alert me if any employee subject to HR disciplinary circumstances (contextual information) is accessing sensitive information (heuristic definition) in a manner that is anomalous when compared to previous behavior (Bayesian probabilistic output)". In other words, different arrays of pyramids of detectors are provided for detecting particular types of threats.

The analysis performed by the detectors on the second order metrics then outputs data in a form suitable for use with the model of normal behavior. As will be seen, the data is in a form suitable for comparing with the model of normal behavior and for updating the model of normal behavior.

At step S4, the threat detection system computes a threat risk parameter indicative of a likelihood of there being a threat using automated adaptive periodicity detection mapped onto observed behavioral pattern-of-life analysis. This deduces that a threat over time exists from a collected set of attributes that themselves have shown deviation from normative collective or individual behavior. The automated adaptive periodicity detection uses the period of time the Bayesian probabilistic has computed to be most relevant within the observed network and/or machines. Furthermore, the pattern of life analysis identifies how a human and/or machine behaves over time, i.e. when they typically start and stop work. Since these models are continually adapting themselves automatically, they are inherently harder to defeat than known systems. The threat risk parameter is a probability of there being a threat in certain arrangements. Alternatively, the threat risk parameter is a value representative of there being a threat, which is compared against one or more thresholds indicative of the likelihood of a threat.

In practice, the step of computing the threat involves comparing current data collected in relation to the user with the model of normal behavior of the user and system being analyzed. The current data collected relates to a period in time, this could be in relation to a certain influx of new data or a specified period of time from a number of seconds to a number of days. In some arrangements, the system is arranged to predict the expected behavior of the system. The expected behavior is then compared with actual behavior in order to determine whether there is a threat.

The system uses machine learning/AI to understand what is normal inside a company's network, and when something's not normal. The system then invokes automatic responses to disrupt the cyber-attack until the human team can catch up. This could include interrupting connections, preventing the sending of malicious emails, preventing file access, preventing communications outside of the organization, etc. The approach begins in as surgical and directed way as possible to interrupt the attack without affecting the normal behavior of say a laptop, but if the attack escalates, it may ultimately become necessary to quarantine a device to prevent wider harm to an organization.

In order to improve the accuracy of the system, a check can be carried out in order to compare current behavior of a user with associated users, i.e. users within a single office. For example, if there is an unexpectedly low level of activity from a user, this may not be due to unusual activity from the user, but could be due to a factor affecting the office as a whole. Various other factors can be taken into account in order to assess whether or not abnormal behavior is actually indicative of a threat.

Finally, at step S5 a determination is made, based on the threat risk parameter, as to whether further action need be taken regarding the threat. This determination may be made by a human operator after being presented with a probability of there being a threat, or an algorithm may make the determination, e.g. by comparing the determined probability with a threshold.

In one arrangement, given the unique global input of the Bayesian probabilistic, a form of threat visualization is provided in which the user can view the threat landscape across all internal traffic and do so without needing to know how their internal network is structured or populated and in such a way as a 'universal' representation is presented in a single pane no matter how large the network. A topology of the network under scrutiny is projected automatically as a graph based on device communication relationships via an interactive 3D user interface. The projection is able to scale linearly to any node scale without prior seeding or skeletal definition.

The threat detection system that has been discussed above therefore implements a propriety form of recursive Bayesian estimation to maintain a distribution over the probability state variable. This distribution is built from the complex set of low-level host, network and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topological rewiring and semantically evolving over time. In many high-dimensional structured I/O problems, such as the observation of packet traffic and host activity within a distributed digital enterprise, where both input and output can contain tens of thousands, sometimes even millions of interrelated features (data transport, host-web-client dialogue, log change and rule trigger, etc.), learning a sparse and consistent structured predictive function is challenged by a lack of normal distribution. To overcome this, the threat detection system consists of a data structure that decides on a rolling continuum rather than a stepwise method in which recurring time cycles such as the working day, shift patterns and other routines are dynamically assigned. Thus providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

Web Site

The web site is configured as a browser-based tool or direct cooperating app tool for configuring, analyzing, and communicating with the cyber threat defense system.

Network

A number of electronic systems and devices can communicate with each other in a network environment. The network environment has a communications network. The network can include one or more networks selected from an optical network, a cellular network, the Internet, a Local Area Network ("LAN"), a Wide Area Network ("WAN"), a satellite network, a $3^{rd}$ party 'cloud' environment; a fiber network, a cable network, and combinations thereof. In some embodiments, the communications network is the Internet. There may be many server computing systems and many client computing systems connected to each other via the communications network.

The communications network can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls and similar defenses to protect data integrity.

At least one or more client computing systems for example, a mobile computing device (e.g., smartphone with an Android-based operating system can communicate with the server(s). The client computing system can include, for example, the software application or the hardware-based system in which may be able exchange communications with the first electric personal transport vehicle, and/or the second electric personal transport vehicle. Each of the one or more client computing systems can have one or more firewalls and similar defenses to protect data integrity.

A cloud provider platform may include one or more of the server computing systems. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In some embodiments, a server computing system can be configured to display information in a window, a web page, or the like. An application including any program modules, applications, services, processes, and other similar software executable when executed on, for example, the server computing system, can cause the server computing system to display windows and user interface screens in a portion of a display screen space. With respect to a web page, for example, a user via a browser on the client computing system can interact with the web page, and then supply input to the query/fields and/or service presented by the user interface screens. The web page can be served by a web server, for example, the server computing system, on any Hypertext Markup Language ("HTML") or Wireless Access Protocol ("WAP") enabled client computing system (e.g., the client computing system 802B) or any equivalent thereof. The client computing system can host a browser and/or a specific application to interact with the server computing system. Each application has a code scripted to perform the functions that the software component is coded to carry out such as presenting fields to take details of desired information. Algorithms, routines, and engines within, for example, the server computing system can take the information from the presenting fields and put that information into an appropriate storage medium such as a database (e.g., database). A comparison wizard can be scripted to refer to a database and make use of such data. The applications may be hosted on, for example, the server computing system and served to the specific application or browser of, for example, the client computing system. The applications then serve windows or pages that allow entry of details.

Computing Systems

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media, such as wireless channels, are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM can include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus, but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system can operate in a networked environment using logical connections to one or more remote computers/client devices, such as a remote computing system. The logical connections can include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application or direct app corresponding with a cloud platform may be resident on the computing device and stored in the memory.

It should be noted that the present design can be carried out on a single computing system and/or on a distributed system in which different portions of the present design are carried out on different parts of the distributed computing system.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A method for tackling investigations into specific real and synthesized cyber threats, comprising:
configuring an Artificial Intelligence (AI)-based cyber-security analyst operating with a human cyber security analyst who may be facing an unidentified cyber threat for a first time;
configuring the AI-based cyber-security analyst to conduct an initial analysis and provide results of the initial analysis to supplement an investigation of a potential cyber security threat by the human cyber security analyst;
configuring an analyzer module in the AI-based cyber-security analyst to use one or more AI models are initially trained through machine-learning on behaviors or suspicious activities provided from multiple data sources to assign a probability of the potential cyber security threat, including simulations, database records, and actual monitoring of different human exemplar cases, where the one or more AI models are trained to learn how the expert human cyber security analysts tackle investigations into specific real and synthesized cyber threats;
configuring the AI-based cyber-security analyst to form one or more hypotheses on what are possible cyber security threats which could be caused by analyzed abnormal behavior or suspicious activity, and then to find evidence data to support or refute each possible hypothesis;
extracting data by a gatherer module on each of the possible cyber security threats;
filtering the extracted data by the gatherer module to produce relevant data that either supports or refutes each of the one or more hypotheses;
configuring the analyzer module to rank, based on the relevant data, supported candidate cyber threat hypotheses by a likelihood that this candidate cyber threat hypothesis is supported, using a confidence schema to sequentially test indicators associated with each hypothesis; and
configuring a formatting module to format, present a rank for, and output the supported cyber threat hypotheses from the analyzer module into a formalized report, from a first template, that is outputted for a human user's consumption in a medium of any of 1) printable report, 2) presented digitally on a user interface, 3) in a machine readable format for further use in machine-learning reinforcement and refinement, or 4) any combination of the three.

2. The method of claim 1 further comprising:
configuring the analyzer module to analyze the possible cyber security threats with the one or more AI models trained with machine learning on the process of the human analyzing the possible cyber security threats and one or more relevant data points human analysts examine to support or rebut their analysis of a given possible cyber threat hypothesis.

3. The method of claim 1, wherein the multiple data sources include simulations, database records, and data associated with actual monitoring of operations by a plurality of expert human cyber security analysts analyzing a risk level regarding the one or more behaviors or suspicious activities.

4. The method of claim 1 further comprising:
configuring the AI cyber-security analyst to automate the analysis with the analyzer module and the one or more AI models trained to learn how the expert human cyber security analysts tackle investigations into specific real and synthesized cyber threats and the formatting module to report possible cybersecurity breaches to improve investigation efficiency and guide the human cyber security analyst; and
configuring the gatherer module to at least one of pull and retrieve some data for each possible hypothesis, where a feedback loop of cooperation is configured between the gatherer module and the analyzer module and to be used to apply the one or more AI models trained on different aspects of this process.

5. The method of claim 1, where the cyber threat hypotheses at least include 1) a human user insider attack, 2) an inappropriate network behavior, 3) a malicious software attack, and 4) a malware attack.

6. The method of claim 1 further comprising:
configuring the gatherer module to cooperate with the analyzer module in collecting the relevant data including supporting points of data and other metrics associated with each particular possible cyber security threat, and a machine learning algorithm is configured to look at the relevant data to support or refute that particular hypothesis of what the abnormal behavior or suspicious activity relates for that cyber security threat.

7. The method of claim 1 further comprising:
configuring the one or more AI models trained with machine learning on the process of the human analyzing on possible cyber threats and one or more relevant data points human analysts examine to support or rebut their analysis of a given possible cyber threat hypothesis to be trained on data sources including two or more of simulations, database records, and actual monitoring of different human exemplar cases as input to train the one or more AI models on how to make a decision.

8. The method of claim 1 further comprising:
configuring the analyzer module to utilize repetitive, iterative feedback for AI models trained with machine learning on possible cyber threats via reviewing a subsequent resulting analysis of one or more of the supported cyber security threat hypotheses and supply that information to the training of the AI models trained with machine learning on possible cyber threats in order to reinforce the model's finding as correct or inaccurate.

9. The method of claim 1 further comprising:
configuring the gatherer module to use a set of scripts to extract data on each possible cyber security threat to supply to the analyzer module, where the gatherer module is configured to use the set of scripts to walk through a step-by-step process of what to collect to filter down to the extracted data to make a decision on what is required by the analyzer module to analyze possible cyber threats with the one or more AI models trained to learn how the expert human cyber security analysts tackle investigations into specific real and synthesized cyber threats.

10. A non-transitory machine readable medium configured to store instructions in an executable format, where the instructions are configured to be executed by one or more processors to perform operations, comprising:
using an Artificial Intelligence (AI)-based cyber-security analyst operating with a human cyber security analyst who may be facing an unidentified cyber threat for a first time;
using the AI-based cyber-security analyst to conduct an initial analysis and then present the analysis to supplement an investigation of a potential cyber security threat by the human cyber security analyst;
using an analyzer module in the AI-based cyber-security analyst to use one or more AI models initially trained through machine-learning on behaviors or suspicious activities provided from multiple data sources to assign a probability of the potential cyber security threat, including simulations, database records, and actual monitoring of different human exemplar cases, where the one or more AI models are trained to learn how the expert human cyber security analysts tackle investigations into specific real and synthesized cyber threats;
using the AI-based cyber-security analyst to form one or more hypotheses on what are possible cyber security threats which could be caused by analyzed abnormal behavior or suspicious activity, and then to find evidence data to support or refute each possible hypothesis;
using a gatherer module of the AI-based cyber-security analyst to extract data on each of the possible cyber security threats;
using a gatherer module of the AI-based cyber-security analyst to filter the extracted data to relevant data that either supports or refutes each of the one or more hypotheses;
using the analyzer module to rank supported candidate cyber threat hypotheses by a likelihood that this candidate cyber threat hypothesis is supported; and
using a formatting module to format, present a rank for, and output one or more supported possible cyber threat hypotheses from the analyzer module into a formalized report, from a first template, that is outputted for a human user's consumption in a medium of any of 1) printable report, 2) presented digitally on a user interface, 3) in a machine readable format for further use in machine-learning reinforcement and refinement, or 4) any combination of the three.

11. An apparatus, comprising:
an Artificial Intelligence (AI)-based cyber-security analyst configured to operate with a human cyber security analyst who may be facing an unidentified cyber threat for a first time, where the AI-based cyber-security analyst is further configured to conduct an initial analysis and then present the analysis to supplement an investigation of a potential cyber security threat by the human cyber security analyst;
wherein an analyzer module in the AI-based cyber-security analyst is configured to use one or more AI models initially trained through machine-learning on behaviors or suspicious activities provided from multiple data sources to assign a probability of the potential cyber security threat, including simulations, database records, and actual monitoring of different human exemplar cases, where the one or more AI models are trained to learn how the expert human cyber security analysts tackle investigations into specific real and synthesized cyber threats,
wherein the AI-based cyber-security analyst is configured to form one or more hypotheses on what are possible cyber security threats which could be caused by analyzed abnormal behavior or suspicious activity, and then the AI Cyber Security analyst is configured to find evidence data to support or refute each possible hypothesis,
wherein a gatherer module of the AI-based cyber-security analyst is configured to extract data on each of the possible cyber security threats and to filter the extracted data to relevant data that either supports or refutes each of the one or more hypotheses,
wherein the analyzer module is configured to rank supported candidate cyber threat hypotheses by a likelihood that this candidate cyber threat hypothesis is supported; and
a formatting module configured to format, present a rank for, and output one or more supported possible cyber threat hypotheses from the analyzer module into a formalized report, from a first template, that is outputted for a human user's consumption in a medium of any of 1) printable report, 2) presented digitally on a user interface, 3) in a machine readable format for further use in machine-learning reinforcement and refinement, or 4) any combination of the three.

12. The apparatus of claim 11, wherein the analyzer module is configured to analyze the possible cyber security threats with the one or more AI models trained with machine learning on the process of a human analyzing on possible cyber threats and one or more relevant data points human analysts examine to support or rebut their analysis of a given possible cyber threat hypothesis.

13. The apparatus of claim 11, wherein the analyzer module is configured to form the one or more hypotheses on what are the possible cyber threats that could include the analyzed abnormal behavior or suspicious activity with the one or more AI models trained with machine learning on the possible cyber security threats, and then the analyzer module is configured to request the relevant data from the gatherer module to perform the analysis of a possible set of activities including cyber threats that could include the analyzed abnormal behavior or suspicious activity.

14. The apparatus of claim 11, wherein the AI cyber-security analyst is configured to automate the analysis with the analyzer module and the one or more AI models trained to learn how the expert human cyber security analysts tackle investigations into specific real and synthesized cyber threats and the formatting module to report possible cyber-security breaches to improve investigation efficiency and guide the human cyber security analyst, and
wherein the gatherer module is configured to at least one of pull and retrieve some data for each possible hypothesis, where a feedback loop of cooperation is configured between the gatherer module and the analyzer module and to be used to apply the one or more AI models trained on different aspects of this process.

15. The apparatus of claim 11, wherein the gatherer module is configured to cooperate with the analyzer module in collecting the relevant data including supporting points of data and other metrics associated with each particular possible cyber security threat, and a machine learning algorithm is configured to look at the relevant data to support or refute that particular hypothesis of what the suspicious activity or abnormal behavior relates for that cyber security threat.

16. The apparatus of claim 11, wherein the one or more AI models trained with machine learning on the process of the human analyzing on possible cyber threats and one or more relevant data points human analysts examine to support or rebut their analysis of a given possible cyber threat hypothesis are trained on data sources including two or more of simulations, database records, and actual monitoring of different human exemplar cases as input to train the one or more AI models on how to make a decision.

17. The apparatus of claim 11, wherein the analyzer module is configured to utilize repetitive feedback for AI models trained with machine learning on possible cyber threats via reviewing a subsequent resulting analysis of one or more of the supported cyber security threat hypotheses and supply that information to the training of the AI models trained with machine learning on possible cyber threats in order to reinforce the model's finding as correct or inaccurate.

18. The apparatus of claim 11, wherein the gatherer module is configured to use a set of scripts to extract data on each possible cyber security threat to supply to the analyzer module, where a gatherer module is configured to use the set of scripts to walk through a step-by-step process of what to collect to filter down to the extracted data to make a decision on what is required by the analyzer module to analyze possible cyber threats with the one or more AI models trained to learn how the expert human cyber security analysts tackle investigations into specific real and synthesized cyber threats.

19. The apparatus of claim 11, wherein an assessment module is configured to assign at least one of i) a probability of or ii) a confidence level that a given cyber threat hypothesis is supported and a threat level posed by that cyber threat hypothesis, which includes the abnormal behavior or suspicious activity forming a chain of unusual behavior or suspicious activity and causal links between the chain, with the one or more AI models trained on possible cyber threats, where the assessment module is configured to receive an input from the analyzer module.

20. The apparatus of claim 11, wherein the possible hypotheses of cyber security threats at least include 1) a human user insider attack, 2) an inappropriate network behavior, 3) a malicious software attack, and 4) a malware attack.

* * * * *